United States Patent [19]
Yawata et al.

[11] Patent Number: 5,428,714
[45] Date of Patent: Jun. 27, 1995

[54] STATUS AND COMMAND FUNCTION EXTENSION FOR INDUSTRY STANDARD PRINTER INTERFACES

[75] Inventors: Kazunari Yawata; Torao Yajima; Takuya Hyonaga; Yoshikazu Ito; Hiroshi Ono; Kazuhisa Aruga; Noboru Yanagisawa, all of Suwa, Japan

[73] Assignee: Seiko Epson Corporation, Tokyo, Japan

[21] Appl. No.: 785,355

[22] Filed: Oct. 29, 1991

[30] Foreign Application Priority Data

Nov. 16, 1990 [JP] Japan ................................. 2-310509
Feb. 13, 1991 [JP] Japan ................................. 3-019841

[51] Int. Cl.$^6$ ............................................. G06F 15/00
[52] U.S. Cl. ............................................. 395/112
[58] Field of Search .................... 364/405, 404, 918.5, 364/235; 235/385; 346/153.1, 76 PH, 157, 160; 355/46; 358/400, 448; 395/112, 117, 162, 200, 275, 325, 575, 800

[56] References Cited

U.S. PATENT DOCUMENTS

| | | | |
|---|---|---|---|
| 4,549,302 | 10/1985 | Heatherington | 375/8 |
| 4,793,605 | 12/1988 | Tajima | 271/9 |
| 4,859,839 | 8/1989 | Tetelman et al. | 235/385 |
| 4,934,845 | 6/1990 | Kato | 400/582 |
| 5,126,786 | 6/1992 | Tanaka | 355/46 |
| 5,210,547 | 5/1993 | Watanabe et al. | 346/76 PH |

FOREIGN PATENT DOCUMENTS

| | | |
|---|---|---|
| 228789 | 7/1987 | European Pat. Off. . |
| 312407 | 4/1989 | European Pat. Off. . |
| 420336 | 4/1991 | European Pat. Off. . |

OTHER PUBLICATIONS

Deskjet 500 Printer Owner's Manual, Appendix C-2, D-2, 2-3, Hewlett-Packard.

*Primary Examiner*—Mark R. Powell
*Assistant Examiner*—U. Chauhan
*Attorney, Agent, or Firm*—W. Douglas Carothers, Jr.

[57] ABSTRACT

A computer system is connected to a printer via a parallel interface, for point-of-sale (POS) applications employing one or more different paper sources, such as, continuous tape, document insertion, and sheet validation. A detector is associated with each paper source to sense a paper empty or out condition. The printer has an addressable latch that enables a choice of one or more of these detectors for connection through to a single status line within the parallel printer interface. The computer CPU can access the addressable latch prior to any printing so that the presence of an appropriate type of paper in its appropriate print position in the printer can be checked or tested utilizing an industry standard parallel printer interface, such as, the widely employed Centronics interface.

24 Claims, 4 Drawing Sheets

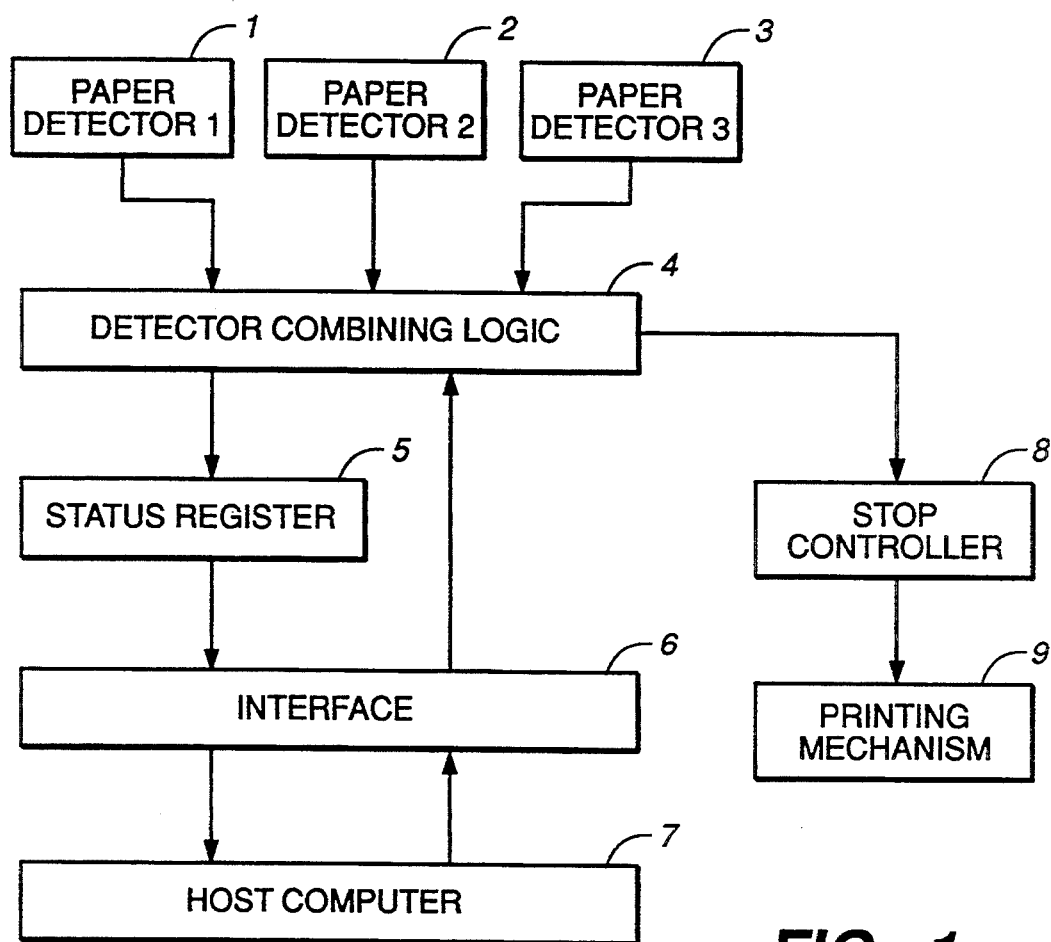
FIG._1
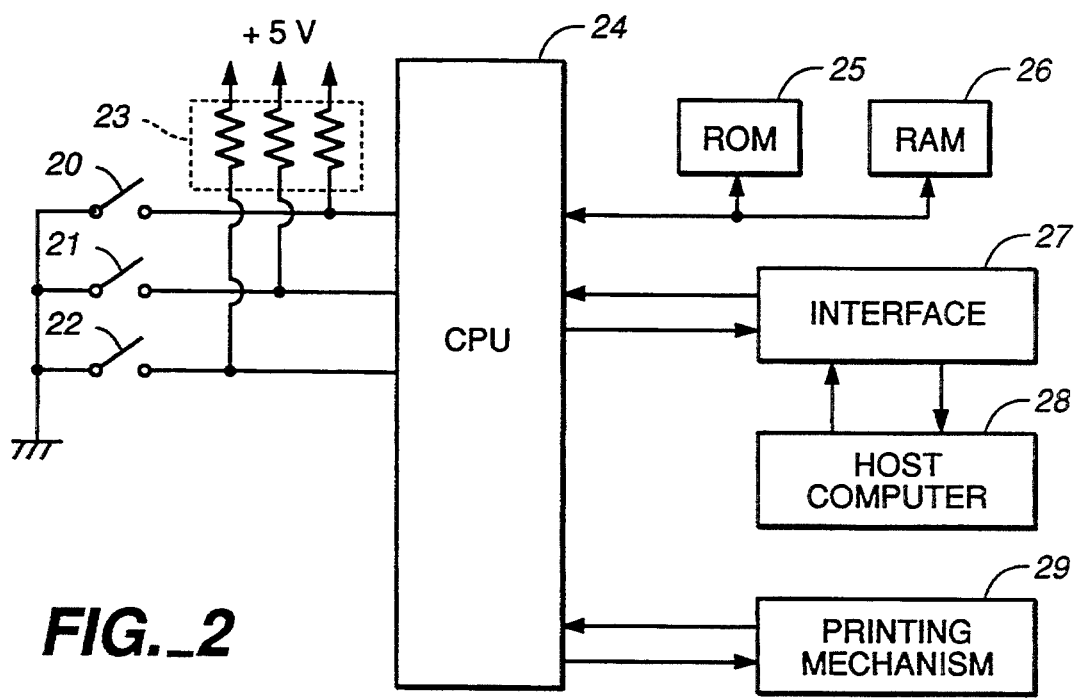
FIG._2

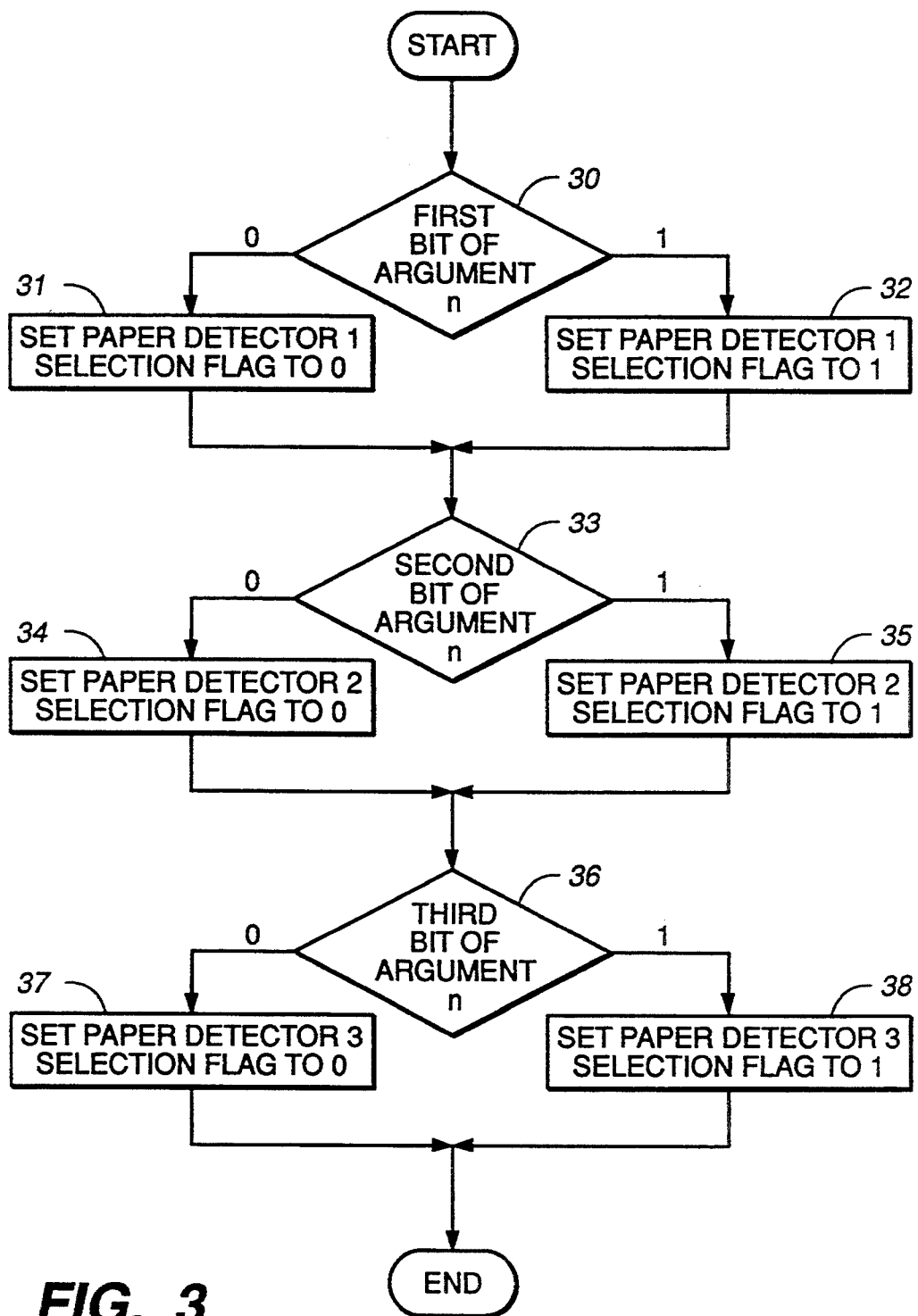
FIG._3

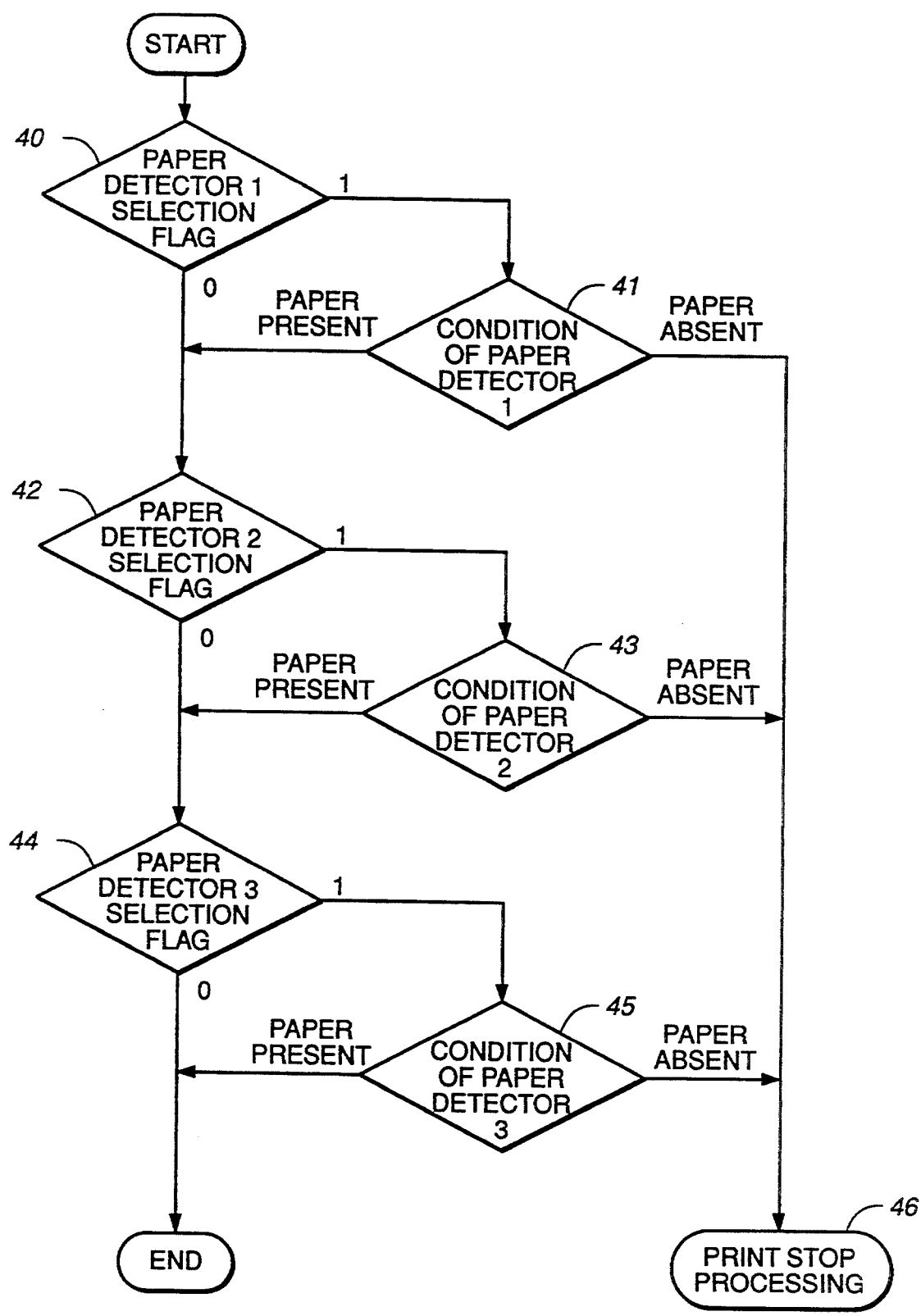
FIG._4

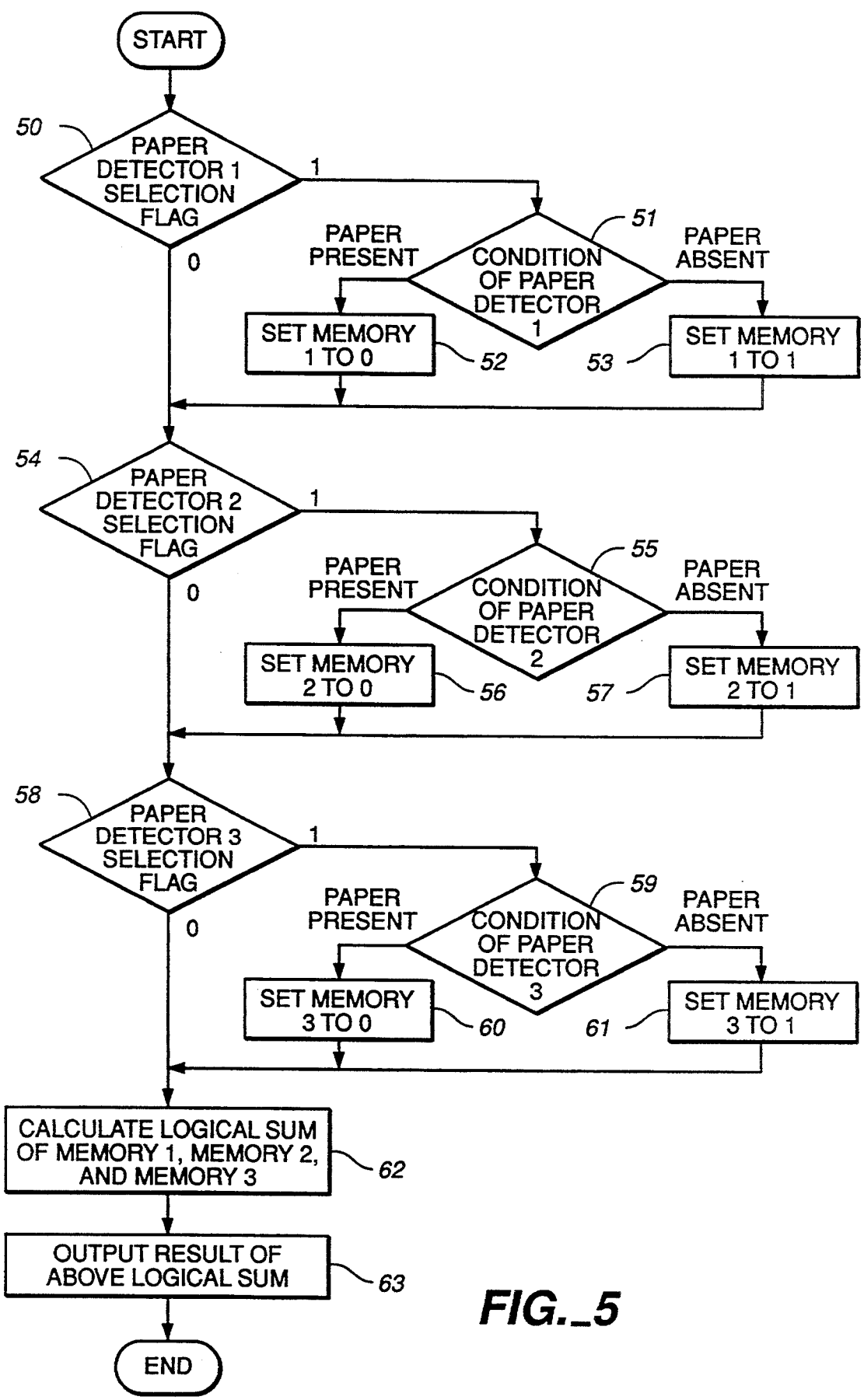
FIG._5

STATUS AND COMMAND FUNCTION EXTENSION FOR INDUSTRY STANDARD PRINTER INTERFACES

BACKGROUND OF THE INVENTION

The present invention relates generally to computer printers and more specifically to the manner of controlling and reading status from specialized point-of-sale printers via standard interfaces. One such standard interface is the so-called "Centronics" parallel interface. Centronics was a company that first introduced this particular interface, but has since gone out of business. However, there is worldwide agreement in the industry of the adaptation and use of this interface as a standard. Another standard interface is the RS-232 serial interface, which is ubiquitous in modems.

The market for store automation equipment is changing rapidly with the widespread use of point-of-sale (POS) terminals. Even small retail stores now have POS equipment. Personal computers have been incorporated into such systems and that is expected to be responsible for higher demands in the future for standardized peripheral devices. But unfortunately, many competing POS terminal printers use mutually incompatible interfaces and command sets. As a result, the range of applications is limited and costs are higher necessary.

Once the most common interface in personal computer printers, the Centronics parallel interface has been succeeded by SCSI, serial, and Appletalk interfaces, especially with regard to laser printers. But IBM compatibles and especially POS equipment still make heavy use of the venerable parallel interface. Seiko Epson Corporation of Tokyo, Japan has promulgated a very popular software interface for the parallel interface called ESC/P.

When the Centronics interface was first defined, there was no need to provide for more than one "paper out" status signal, e.g., pin 12, signal "PE", as seen in Table I below.

TABLE I

| | | (Parallel Printer Interface) | |
|---|---|---|---|
| Pin | Signal | I/O | Function |
| 1 | STROBE* | Input | STROBE* pulse width for reading data. Pulse width must be 0.5 microseconds or more at the receiver terminal. Normal state is HIGH. Data is read after the signal goes LOW. |
| 2 | DATA0 | Input | Parallel data bits 0–7. |
| 3 | DATA1 | Input | HIGH represents bit is "1". |
| 4 | DATA2 | Input | LOW represents data bit is "0". |
| 5 | DATA3 | Input | |
| 6 | DATA4 | Input | |
| 7 | DATA5 | Input | |
| 8 | DATA6 | Input | |
| 9 | DATA7 | Input | |
| 10 | ACKNLG* | Output | LOW means the printer is ready to receive data. The pulse width is about 10 microseconds. |
| 11 | BUSY | Output | HIGH means that the printer cannot receive data. LOW indicates that the printer is ready. This signal will go HIGH, 1. after power-on initialization; 2. when the receive buffer is full; 3. for error conditions; in OFF-LINE state; 4. during and after a self-test; and 5. during data entry. |

TABLE I-continued

| | | (Parallel Printer Interface) | |
|---|---|---|---|
| Pin | Signal | I/O | Function |
| 12 | PE | Output | HIGH indicates printer has run out of paper (when paper end detection is enabled by control command). |
| 13 | SLCT | Output | Pulled up to +5V with a 3.3K ohm resistor. |
| 14 | AUTO FEED XT* | Input | When this signal goes LOW, the printer executes one line feed for each carriage return received. |
| 15 | NC | | No connection. |
| 16 | GND | | Logic ground. |
| 17 | CHASSIS GND | | Chassis ground. |
| 18 | NC | | No connection. |
| 19-30 | GND | | Ground for twisted pair returns. |
| 31 | INIT | Input | Printer hardware reset. Normally HIGH, the printer will reinitialize when this signal goes LOW for more than fifty microseconds. |
| 32 | ERROR* | Output | This signal goes LOW. 1. after power-on and until the printer goes ready; 2. for mechanical error conditions; 3. in the OFF-LINE state; and 4. during self-test. |
| 33 | GND | | Ground for twisted pair return. |
| 34 | DRAWER KICK STATUS | Output | Pulled up to +5V through a 3.3K ohm resistor. The drawer kick out connector status signal is a direct output. (The host CPU sends an "ESC p" sequence to have the cash drawer pop out.) |
| 35 | +5V | Output | Pulled up to +5V through a 3.3K ohm resistor. |
| 36 | NC | | No connection. |

*Indicates negative is true

Point-of-sale systems have become indispensable in the distribution and service industries. However, a POS environment as a whole reveals a number of deficiencies which needed to be addressed. With respect to printers, entirely different sets of commands have been defined by various manufacturers for particular applications. Only the basic commands seem to have been left alone so that there is some uniformity. The present invention defines a command set extension to the ESC/P, hereinafter referred to as ESC/POS, meeting the needs of the POS industry. ESC/POS divides printer functions and commands employed in the POS environment into clearly defined categories.

Conventional configurations are so limited that newer POS printers, which are capable of working with a variety of paper sources, were difficult to control because the paper status of individual paper sources for the POS printer could not be polled as to status. The system had to assume the paper was ready, and very often this was not the case.

Many ad hoc solutions appeared in the market place that implemented a few new commands, but these were one-time solutions that found little favor with the majority of POS manufacturers and were generally incompatible with one another. An object of the present invention is to provide an interface with a comprehensive set of commands that embrace the more established of these earlier individual commands.

A further object of the present invention is to provide a printer controller capable of selecting a specific detector, based on a previous command from the host computer and capable of halting printing operation until a detector indicates that a paper supply is ready.

SUMMARY OF THE PRESENT INVENTION

According to this invention, a computer system is connected to a printer with a parallel interface and employs several different paper sources. There is a detector associated with each paper source to sense a paper empty condition. The printer has an addressable latch that will enable a choice of checking these detectors through a single status line within the parallel printer interface. The computer CPU can access the addressable latch prior to any printing operation so that the presence of an appropriate paper at an appropriate print position in the printer can be checked or tested utilizing an industry standard parallel printer interface.

An advantage of the present invention is that all of paper detectors can be individually selected by special control commands issued from a host computer.

A further advantage of the present invention is that only one, existing signal line, connected to the host computer, is required.

A further advantage of the present invention is that host computer control can be easily rendered of a higher level of operating sophistication beyond that of prior art levels providing more articulate control of a printer.

Other objects and attainments together with a fuller understanding of the present invention will become apparent and appreciated by referring to the following description and claims taken in conjunction with the accompanying drawings.

BRIEF DESCRIPTION OF THE DRAWINGS

FIG. 1 is a block diagram of the printer controller according to an embodiment of the present invention.

FIG. 2 is a simplified block diagram of a microcomputer for implementing a detector combining logic, stop controller, and status register of the system of FIG. 1.

FIG. 3 is a flowchart showing detector combining logic for the microcomputer of FIG. 2.

FIG. 4 is a flowchart showing a stop controller for the microcomputer of FIG. 2.

FIG. 5 is a flowchart showing a status register for the microcomputer of FIG. 2.

DESCRIPTION OF THE EMBODIMENTS

Various papers are commonly employed in point-of-sale (POS) printers. They are distinguished by three basic types: a journal for the store or business, a receipt for the customer, and a validation card or slip to be forwarded to a credit card company. POS printers that accept more than one such kind of paper and having multiple pathways for such paper have become widespread and are in common use.

FIG. 1 is a block diagram of a printer controller according to an embodiment of the present invention and comprises a journal paper detector 1, a receipt paper detector 2, and a slip paper detector 3. The printer controller is typically located within a computer printer and is in communication with a host computer 7 over an industry standard, Centronics parallel interface 6. Table I sets forth the signals comprising interface 6. While the printer is, of course, capable of printing characters received via printing commands from the host computer, the printer can also respond to non-printing commands when these commands are encoded into an "escape sequence", as described below.

Each paper detector 1-3 reports on a respective paper status at a respective paper supply. Detector combining logic 4 produces various logical combinations of one or more of these paper detectors 1-3 at its output, depending on control commands previously received from the host computer 7 via interface 6. Stop controller 8 is configured to halt printing in response to any of one of the enabled paper detectors 1-3. Status register 5 receives a status signal from one or more of the enabled paper detectors and host computer 7 can receive the signal and determine detector status via interface 6.

Command Protocol ESC/POS

A command protocol ESC/POS separates printer commands into two types: "grade" and "sheet". Grade commands are further divided into basic and extension commands. Sheet commands are also further divided into single sheet and multiple sheet commands. There are three types of extensions: mechanical, hardware, and software. Table II diagrams this command structure as a two-dimensional array.

TABLE II

| | Single Sheet | Multiple Sheet |
|---|---|---|
| Basic Commands | Single Sheet Commands | Multiple Sheet Additional Commands |
| Extension Commands | > | Mechanical Extension |
| | > | Hardware Extension |
| | > | Software Extension |

The following tables list the individual commands that comprise the basic and extension commands. Indication is provided to the printer that a non-printing command sequence is being transmitted from the host computer by transfer of an "ESC" character (lB hex). The next following character or characters identify the particular command to be executed.

BASIC COMMANDS

TABLE III

| | Single Sheet Commands |
|---|---|
| Code | Function |
| LF | Print and line feed |
| ESC SP | Set character right-side spacing |
| ESC ! | Set print mode |
| ESC * | Set bit image code |
| ESC @ | Initialize printer |
| ESC R | Select international character set |
| ESC d | Print and feed paper n lines |
| ESC t | Select character code table |
| ESC { | Set/cancel upside-down character printing |

TABLE IV

| | Multiple Sheet Commands |
|---|---|
| Code | Function |
| ESC c 0 | Select print sheet(s) |

TABLE V

| | Mechanical Extensions |
|---|---|
| Code | Function |
| FF | Print and eject cut sheet |
| CR | Print and carriage return |
| RS | Journal tab |
| ESC 2 | Set 1/6 inch line spacing |
| ESC 3 | Set minimum line spacing |
| ESC < | Return home |
| ESC C | Set cut sheet eject length |
| ESC F | Set/cancel cut sheet reverse eject |
| ESC J | Print and minimum fired |
| ESC K | Print and reverse minimum feed |
| ESC U | Set/cancel uni-directional printing |

TABLE V-continued

Mechanical Extensions

| Code | Function |
| --- | --- |
| ESC c 1 | Select paper for setting line spacing |
| ESC c 3 | Select paper detectors to output |
| ESC c 4 | Select paper detectors to stop printing |
| ESC e | Print and reverse feed n lines |
| ESC f | Set cut sheet waiting time |
| ESC i | Execute full cut |
| ESC m | Execute partial cut |
| ESC o | Stamp |
| ESC q | Release |
| ESC r | Select print color |
| ESC z | Set/cancel parallel printing on two sheets |

TABLE VI

Hardware Extension

| Code | Function |
| --- | --- |
| ESC BEL | Buzzer ON/OFF |
| ESC c 5 | Enable/disable panel switches |
| ESC c 6 | Enable/disable ON-LINE switch |
| ESC p | Generate pulse |
| ESC v | Transmit printer status |
| ESC ~ | LED ON/OFF |

TABLE VII

Software Extensions

| Code | Function |
| --- | --- |
| HT | Horizontal tab |
| ESC % | Set/cancel user-defined character set |
| ESC & | Define user-defined characters |
| ESC D | Set horizontal tab positions |

Mechanical extension "ESC c 3" is followed by a byte, "n", so that four bytes are sent in a row: 1BH, 63H, 33H, and n (H signifies hexadecimal notation). Each of the eight bits in byte "n" has a function, which is shown in Table VIII. This extension selects which of the paper detectors is to provide an output onto the paper-end (PE) status line (Table I, pin 12). This selection remains valid until changed. Each of the eight functions is independent. For example, paper detector for journal and receipt near their paper end condition can be both off (bits 0 and 1 LOW), the journal-near-end on (bit 0 HIGH), the receipt-near-end on (bit 1 HIGH), or both journal-near-end and receipt-near-end on (bits 0 and 1 both HIGH). The paper detectors will OR their outputs in the case where more than one is enabled.

TABLE VIII

| Bit | Function | bit = 0 | bit = 1 |
| --- | --- | --- | --- |
| 0 | Journal-near-end | Disabled | Enabled |
| 1 | Receipt-near-end | Disabled | Enabled |
| 2 | Journal | Disabled | Enabled |
| 3 | Receipt | Disabled | Enabled |
| 4 | Slip TOF | Disabled | Enabled |
| 5 | Slip BOF | Disabled | Enabled |
| 6 | Validation TOF | Disabled | Enabled |
| 7 | Validation BOF | Disabled | Enabled |

TOF = Top-Of-Form
BOF = Bottom-Of-Form

As previously mentioned, it is possible to select multiple detectors to output their status signals. In this situation, if only one paper detector detects a no paper condition, the paper-end signal is provided as output. The output timing for the selected detector status differs depending on the printer model.

Mechanical extension "ESC c 4" is followed by a byte "n", so that four bytes are sent in a row: 1BH, 63H, 34H, and n (H signifies hexadecimal notation). Each of the eight bits in byte "n" has a function, as illustrated in Table IX. This extension selects which of the paper detectors are to be employed to stop printing. This selection remains valid until changed.

TABLE IX

| Bit | Function | bit = 0 | bit = 1 |
| --- | --- | --- | --- |
| 0 | Journal near end | Disabled | Enabled |
| 1 | Receipt near end | Disabled | Enabled |
| 2 | Journal | Disabled | Enabled |
| 3 | Receipt | Disabled | Enabled |
| 4 | Slip TOF | Disabled | Enabled |
| 5 | Slip BOF | Disabled | Enabled |
| 6 | Validation TOF | Disabled | Enabled |
| 7 | Validation BOF | Disabled | Enabled |

When a paper-end detector is enabled, the printing will not be stopped unless the corresponding paper is selected as the print sheet. Selecting more than one detector to stop printing will stop printing if any one of the selected detectors detects a no paper condition, via the OR function. Printing will be stopped after the current line of printing is completed and the paper has been fed. When a paper-end condition has been detected by either the journal or receipt detector, the printer will go OFF-LINE after cessation of printing. When a paper-end condition is detected by any of the cut sheet paper-end detectors, printing is continued until printing on the cut sheet is completed and the sheet is ejected. The printer then will await the detection of another cut sheet loaded into the printer.

FIG. 2 represents one way to implement the printer controller of FIG. 1. Paper detectors 1-3 correspond to a set of three switches 20-22. A resistor network 23 is used to pull-up the signal line outputs when any one of the respective switches 20-22 is open. Switches 20-22 can be mechanical switches, such as, micro-switches, or open-collector outputs of photo detectors. Interface 27 is similar to interface 6 of FIG. 1, as is host computer 28 to host computer 7. Printing mechanism 29 represents the remaining functional parts of a standard computer printer. A microcomputer, comprising a CPU 24, a ROM 25, and a RAM 26, replace and correspond to detector combining logic 4, stop controller 8, and status register 5. Paper detector switches 20-22 open and output a high condition, due to pull-up resistor network 23, when a no-paper condition is sensed. The microcomputer system receives signals from paper detector switches 20-22 and interprets commands from host computer 28. The microcomputer system has the following functions:

Selection of particular paper detectors in response to control commands.

Stopping printing based on the status of the paper detectors.

Sensing the paper detectors.

Reporting the status of paper detection to host computer 28.

Printing mechanism 29 comprises printing, and a controller for setting a 1/6 inch line spacing; setting a minimum line spacing; returning a carriage to a home position, setting a cut sheet eject length; setting/canceling a cut sheet reverse eject, printing and minimum feeding; printing and reverse minimum feeding; setting/canceling a uni-directional printing, selecting a paper for setting a line spacing; selecting a combination of paper detectors to be output; selecting a combination of paper detectors to stop printing; printing and reverse feeding "n" number of lines; setting a cut sheet waiting time; executing a full cut; executing a partial cut; stamping; releasing; selecting a print color; setting/canceling a parallel printing on two sheets; turning a buzzer ON/OFF; enabling/disabling a number of panel switches; enabling/disabling an ON-LINE switch; generating a signal pulse to the interface 27; transmitting a printer status; turning an LED ON/OFF; setting/canceling a user-defined character set; defining a user-defined character; and setting a horizontal tab position. Each portion of the printing and controller is responsive to the respective commands in Tables V, VI, and VII.

A computer-implemented process is stored in ROM 25 in the form of a firmware program for control command interpretation. RAM 26 stores any flags and other temporary data required by the microcomputer system.

The flowchart of FIG. 3 is a computer-implemented process for enabling and disabling paper detectors 20–21 according to a byte "n" received in either an "ESC c 3n" sequence or an "ESC c 4n" sequence. Step 30 tests the first bit of byte "n" and, if a zero flag bit is detected, the detector flag one is reset to zero in step 31; otherwise, detector 1 flag is set to one in step 32. Step 33 tests the second bit of byte "n", and, if a zero flag bit is indicated, detector flag two is reset to zero in step 34; otherwise, detector flag 2 is set to one in step 35. Step 30 tests the third bit of byte "n", and if a zero flag bit is indicated, detector flag three is reset to zero in step 37; otherwise, flag three is set to one in step 38. Detection ends and control returns to the host.

The flowchart of FIG. 4 represents a computer-implemented process for management of the stop controller. Beginning at step 40, flag one is checked or tested. If set, at step 41, paper detector 20 is read. Otherwise, control moves on to step 42. If at step 41, the absence of paper is detected, control branches to step 46, and printing is stopped in the manner previously described. Next, at step 42, flag two is checked or tested. If set at step 43, paper detector 21 is read. Otherwise, control moves on to step 44. If at step 43, the absence of paper is detected, control branches to step 46, and printing is stopped in the manner previously described. At step 44, flag three is checked or tested. If set, at step 45, paper detector 22 is read. If paper present condition is determined affirmative, control returns to the host (END). If at step 45, the absence of paper is detected, control branches to step 46, and printing is stopped in the manner previously described.

The flowchart in FIG. 5 illustrates a third computer-implemented process that runs on the microcomputer system. At step 50, detector flag one is tested. If zero, control moves on to step 54; otherwise, at step 51, the condition of paper detector 20 is tested. If paper is present, step 52 sets a first memory to zero. If paper is not present, step 53 sets the first memory to one. At step 54 detector flag two is tested. If zero, control moves on to step 58; otherwise, at step 55 the condition of paper detector 21 is tested. If paper is present, step 56 sets a second memory to zero. If paper is not present, step 57 sets the second memory to one. At step 58, detector flag three is tested. If zero, control moves on to step 62; otherwise, at step 59 the condition of paper detector 22 is tested. If paper is present, step 60 sets a third memory to zero. If paper is not present, step 61 sets the third memory to one. At step 62, the sum of all three memories is accomplished. Step 63 is the resulting output of step 62, for example, paper-end signal, PE, at interface 27 (Table I, line 12).

The flowcharts of FIGS. 3, 4 and 5 are for embodiments utilizing three paper detectors. However, obviously more or less number of detectors may be utilized.

Not all of the commands (e.g., Tables V, VI, or VII) need to be and are preferably not implemented in a single printer or host computer. Less expensive interfaces may be provided with sub-sets of these commands. It is important, however, that those commands that are implemented follow the plan of implementation presented above, so that incompatibilities do not occur across product lines or within printer systems as the functions of such systems are expanded. Therefore, an embodiment of the present invention is a printer that selects one or more commands for implementation from these several tables, Tables V, VI, or VII such that other printers will be compatible in selecting other commands for implementation from these same tables.

As a corollary, another embodiment of this invention is a computer system host that selects one or more commands for implementation from Tables V, VI, or VII such that other system hosts and printers that select other commands for implementation from these same tables will be compatible within a single area of application.

Alternatively, the above interface and command protocol can be easily and directly applied to serial interfaces, which are just as widespread in use as the use of parallel interfaces. The serial interfaces generally follow the EIA RS-232 interconnect specification for full-duplex communication with "modem" status and control and are ubiquitous. Therefore, the "ESC" sequences are converted to a serial bit stream before being sent to a printer, and vice versa.

While the present invention has been described in conjunction with several specific embodiments, it is evident to those skilled in the art that many further alternatives, modifications and variations will be apparent in light of the forgoing description. Thus, the present invention described herein is intended to embrace all such alternatives, modifications, applications and variations as may fall within the spirit and scope of the appended claims.

What is claimed is:

1. A printer system comprising:
  a printer for printing print data on a plurality of different types of recording medium provided along at least two different input points in a recording medium transport path through said printer,
  a plurality of printer inputs in said printer for respectively receiving a recording medium type at said different input points along said transport path, said printer inputs being mutually exclusive for receipt and transport of a different type of recording medium;
  a host computer for sending command data and print data to said printer,
  an interface coupled between said host computer and said printer and having signal lines and a plurality of data lines for, respectively, sending said command data and print data to said printer and a single status line for receiving status data from said printer;
  data interpreting means for classifying command data received from said host computer into said command data and said print data;

a plurality of detectors one at each of said printer inputs and having respective outputs providing a status signal indicative of the presence or absence of recording medium at a corresponding respective printer input; and selection means responsive to said command data from said host computer, via said data interpreting means, for selecting one or more of said detectors independently of selection of a recording medium type to be printed.

said selection means for monitoring status signals of said selected detectors and for providing a logical combination of said selected detector status signals for communication as a single status bit comprising status data via said status line to said host computer via said interface indicative to said host computer of a condition that either one or more than one of said printer inputs is absent of its respective recording medium.

2. The printer system of claim 1 wherein said interface comprises an industry standard Centronics parallel interface with eight data lines.

3. The printer system of claim 1 wherein said data interpreting means comprises means for classifying data preceded by an escape (ESC) character as being said command data.

4. The printer system of claim 1 wherein said selection means is responsive to command data from said host computer via said data interpreting means for selecting one or more of said detectors for providing a printing interrupt condition at said printer relative to at least one of said printer inputs when a detector status signal thereof is indicative of absence of recording medium at a corresponding recording medium input; and printing stop means for interrupting printing at said printer upon occurrence of said printing interrupt condition.

5. The printer system of claim 4 wherein said printing is terminated after printing completion of a current line of print data.

6. The printer system of claim 1 wherein there are at least three detectors at said printer corresponding to three different kinds of recording medium comprising a journal entry paper, a receipt paper, and a slip paper.

7. A printer comprising:

a plurality of different types of recording medium provided at different recording medium inputs to a recording medium transport path through said printer, an interface having signal lines for a plurality of data lines, a strobe, an acknowledge, a busy, and a recording medium end;

data interpreting means for classifying data from a data source into command and character data;

at least two recording medium detectors at respective recording medium inputs to said transport path having respective outputs indicative of a presence or absence of recording medium at an input;

selection means responsive to said data interpreting means such that a logical combination of outputs of said recording medium detectors can be communicated as a single bit of status comprising a recording medium end signal to said interface;

said selection means responsive to an escape sequence of "ESC c 3" followed by a control byte for bit control of individual recording medium detector outputs for determining a selection of one or more detectors independently of selection of a recording medium type to be printed provided at a respective recording medium input.

8. A printer comprising:

a plurality of different types of recording medium provided at different recording medium inputs to a recording medium transport path through said printer.

an interface having signal lines for a plurality of data lines, a strobe, an acknowledge, a busy, and a recording medium end;

data interpreting means for classifying data from a data source into command and character data;

at least two recording medium detectors at respective recording medium inputs to said transport path having respective outputs indicative of a presence or absence of recording medium at an input;

selection means responsive to said data interpreting means such that a logical combination of outputs of said recording medium detectors can be communicated as a single bit of status comprising a recording medium end signal to said interface;

said selection means responsive to an escape sequence of "ESC c 4" followed by a control byte for bit control of individual recording medium detector outputs for determining a selection of one or more detectors for indicating a printer interrupt condition independently of selection of a detector for indicating a presence or absence of a recording medium type provided at a respective recording medium input.

9. A printer comprising:

a host computer connected to said printer via a parallel printer interface, said printer having two or more types of printing medium sources at different recording medium inputs of said printer for providing different printing applications with different types of recording medium, a detector associated with each of said recording medium inputs for providing an output indicative of a condition of a corresponding printing medium source relative to a status of medium presence or medium absence, data interpreting means for classifying data from said host computer into command and character data, selection means responsive to said data interpreting means such that a logical combination of outputs of said detectors is communicated as a single bit of the status to said printer interface, said data interpreting means comprises means for classifying data preceded by an escape (ESC) character as command data, said data classifying means classifies several selectable detector functions, any one of which may be individually implemented in said printer, according to command data following the escape (ESC) character relative to the following table:

| Command/Data | Function |
| --- | --- |
| ESC $n_1$ | Select recording medium type for setting print line spacing for selected medium type |
| ESC $n_2$ | Select detectors for observing their output for presence or absence of recording medium at printer inputs |
| ESC $n_3$ | Select recording medium detectors for printer inputs that require printing interrupt when absent of recording |

| Command/Data | Function |
| --- | --- |
| | medium at printer inputs | the classification of said ESC $n_2$ and ESC $n_3$ functions respectively accomplished independent of any selection of a recording medium type to be printed at a particular recording medium input and independent of any selection of a detector to indicate a presence or absence of recording medium at a particular recording medium input.

10. The printer of claim 9 wherein $n_1$ is command data, c 1, $n_2$ is command data, c 3, and $n_3$ is command data, c 4.

11. A printing system comprising:
a host computer connected to a printer via a parallel printer interface,
said printer having two or more types of printing medium sources at different recording medium inputs of said printer for providing different printing applications with different types of recording medium,
a detector associated with each of said recording medium inputs for providing an output indicative of a condition of a corresponding printing medium source relative to a status of medium presence or medium absence, and
selection means for selecting one or more of said detectors to monitor the outputs of said selected detectors for (1) selecting a detector at a particular recording medium input for determining the presence or absence of a recording medium at the input independently of selection of a recording medium type to be printed at any medium input or (2) selecting a detector at a particular recording medium input to be indicative of a printing interrupt condition independently of selection of a detector for determining the presence or absence of a recording medium at any medium input.

12. The printing system of claim 11 wherein said status is provided as a single status signal on a single status line to said host computer indicative of a combined condition status of the selected detectors, said single status signal indicative of a presence or absence of recording medium at recording medium inputs of said selected detectors.

13. The printing system of claim 12 wherein said single status signal is indicative of an absence of recording medium at least at one of said recording medium inputs of said selected detectors and indicative of a necessity of a printing interrupt at said at least one printer input.

14. The printing system of claim 12 wherein said single status signal is indicative of the presence or absence of recording medium at least at one of said recording medium printer inputs via a first of said selected detectors indicative of a necessity of a printing interrupt at said at least one recording medium input, and indicative of the absence of recording medium at least at another of said recording medium inputs via a second of said selected detectors and indicative of a necessity of a printing enablement upon subsequent detection of presence of recording medium at said at least another recording medium input.

15. A printing system comprising:
a host computer connected to a printer via a parallel printer interface,
said printer having two or more types of printing medium sources at different recording medium inputs of said printer for providing different printing applications with different types of recording medium,
a detector associated with each of said printer inputs for providing an output indicative of a condition of a corresponding printing medium source relative to a status of medium presence or medium absence,
first selection means for selecting one or more of said detectors to monitor selected outputs of said selected detectors for providing an indication to said host computer to operate said printer according to a first status condition independently of selection of a recording medium type to be printed, and
second selection means, independent of any selection of said first selection means, for selecting one or more of said detectors to monitor selected outputs of said selected detectors for providing an indication to said host computer to operate said printer according to a second status condition independently of selection of a detector for indicating said first status condition, and
means to enable or disable a printing operation of said printer based upon said first or second status condition.

16. The printing system of claim 15 wherein said first selection means providing a first status condition for preventing an occurrence of a printing operation when the status condition of one of said selected detectors via said first selection means indicates medium absence and thereafter enabling the printing operation when the status condition of said one of said selected detectors subsequently indicates medium presence.

17. The printing system of claim 15 wherein said second selection means providing a second status condition for causing cessation of an existing printing operation when the status condition of one of said selected detectors via said second selection means indicates medium absence.

18. The system of claim 15 wherein a combined output of said selected detectors of at least one of said selection means is provided as status bits in a single data byte.

19. A method of controlling a printer having a plurality of recording medium inputs for different kinds of recording medium types in a printer, a detector at each of the recording medium inputs for checking a condition of presence or absence of recording medium at its input, and a single status line between the printer and a host computer for sending a signal to the host computer indicative of the presence or absence of recording medium at least at one of the recording medium inputs, comprising the steps of:
selecting one or more of a plurality of recording medium detectors independently of selection of a recording medium type to be printed at a particular recording medium input via a command from the host computer indicative of which of the selected detectors should be observed for the condition,
checking for a status of the condition,
providing a single status signal on the status line to the host computer indicative of a combined condition status of the selected detectors.

20. The method according to claim 19 further comprising the step of calculating a logical OR of the condition status of each of the selected detectors as the single status signal to the host computer.

21. A method of controlling a printer having a plurality of recording medium inputs for different kinds of recording medium types in a printer, a detector at each of the recording medium inputs for checking a condition concerning a status of either a presence or absence of recording medium at a corresponding recording medium input, and means for providing an indication to a host computer indicative of a presence or absence of recording medium at least at one of the recording medium inputs, comprising the steps of:

independently selecting one or more of a plurality of recording medium detectors independently of selection of a recording medium type to be printed at a particular recording medium input via a first command indicative of which of first of selected detectors are for observing a first condition status, independently selecting one or more of the recording medium detectors independently of selection of a detector for the first condition status via a second command indicative of which of second selected detectors are for observing a second condition status, and enabling or disabling a printing operation at the printer based upon an occurrence of either a first or second condition status.

22. The method according to claim 21 wherein further comprising the step of calculating a logical OR of the condition status of each of the first and second selected detectors as a single status signal to the host computer.

23. The method according to claim 21 wherein an occurrence of a first condition status comprises the step of preventing an occurrence of a printing operation when a status of one of said first selected detectors is indicative of medium absence and thereafter enabling the printing operation when the status condition of said one of said first selected detectors is subsequently indicative of medium presence.

24. The method according to claim 21 wherein an occurrence of a second condition status comprises the step of interrupting a printing operation in progress when the status of one of said second selected detectors is indicative of medium absence.

* * * * *

UNITED STATES PATENT AND TRADEMARK OFFICE
CERTIFICATE OF CORRECTION

PATENT NO.   : 5,428,714
DATED        : June 27, 1995
INVENTOR(S)  : Kazunari Yawata, et al.

It is certified that error appears in the above-indentified patent and that said Letters Patent is hereby corrected as shown below:

Column 12, Claim 18, Line 43, change:

"The system of claim 15" to --The printing system of claim 15--.

Signed and Sealed this

Nineteenth Day of March, 1996

Attest:

BRUCE LEHMAN

Attesting Officer          Commissioner of Patents and Trademarks